(12) United States Patent
Herzberger et al.

(10) Patent No.: US 11,296,565 B2
(45) Date of Patent: Apr. 5, 2022

(54) STATOR FOR AN ELECTRIC MACHINE

(71) Applicant: Robert Bosch GmbH, Stuttgart (DE)

(72) Inventors: Andreas Herzberger, Remseck-Aldingen (DE); Armin Elser, Alfdorf-Brech (DE); Martin Ermer, Hildesheim (DE); Patrick Heuser, Stuttgart (DE); Tobias Hein, Gronau (DE); Johannes Riedl, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 16/755,671

(22) PCT Filed: Sep. 4, 2018

(86) PCT No.: PCT/EP2018/073762
§ 371 (c)(1),
(2) Date: Apr. 13, 2020

(87) PCT Pub. No.: WO2019/072456
PCT Pub. Date: Apr. 18, 2019

(65) Prior Publication Data
US 2021/0376678 A1    Dec. 2, 2021

(30) Foreign Application Priority Data
Oct. 11, 2017  (DE) .................... 10 2017 218 078.1

(51) Int. Cl.
*H02K 3/12* (2006.01)
*H02K 3/28* (2006.01)

(52) U.S. Cl.
CPC .............. *H02K 3/12* (2013.01); *H02K 3/28* (2013.01)

(58) Field of Classification Search
CPC .................................. H02K 3/12; H02K 3/28
See application file for complete search history.

(56) References Cited

U.S. PATENT DOCUMENTS

| | | | |
|---|---|---|---|
| 6,885,124 B2 * | 4/2005 | Neet | H02K 3/12 310/201 |
| 7,170,211 B2 * | 1/2007 | Chen | H02K 3/12 310/184 |

(Continued)

FOREIGN PATENT DOCUMENTS

| | | |
|---|---|---|
| CN | 101490933 A | 7/2009 |
| CN | 104333192 A | 2/2015 |

(Continued)

OTHER PUBLICATIONS

International Search Report for Application No. PCT/EP2018/073762 dated Dec. 20, 2018 (English Translation, 2 pages).

*Primary Examiner* — Robert W Horn
(74) *Attorney, Agent, or Firm* — Michael Best & Friedrich LLP

(57) ABSTRACT

The invention relates to a stator having a multi-phase wave winding made of hairpin conductor elements (5). Each phase consists of two parallel or serially connected branches (6, 6.1, 6.2). Each branch has a first (3.1) and a second (3.2) winding portion, which are connected to each other in series. The slot position of the two limbs (5.1) of each hairpin conductor element alternates by +−1. The first winding portion (3.1) extends clockwise along the stator circumference; the second winding portion (3.2) extends counterclockwise and is connected to the first winding portion via a reverse-connector conductor element (12, 12.1, 12.2). Both limbs of the reverse-connector conductor element (12.1) of the first winding branch (6.1) are located in the uppermost slot position; the limbs of the reverse-connector conductor element (12.2) of the second winding branch (6.2) are located in the lowermost slot position.

20 Claims, 7 Drawing Sheets

(56) References Cited

U.S. PATENT DOCUMENTS

| | | | |
|---|---|---|---|
| 7,781,933 B2* | 8/2010 | Koide | H02K 3/28 |
| | | | 310/182 |
| 7,830,060 B2* | 11/2010 | Miyata | H02K 3/28 |
| | | | 310/179 |
| 8,598,765 B2* | 12/2013 | Kashihara | H02K 3/28 |
| | | | 310/207 |
| 9,130,431 B2* | 9/2015 | Seguchi | H02K 3/50 |
| 9,325,211 B2* | 4/2016 | Sakuma | H02K 3/28 |
| 9,379,586 B2* | 6/2016 | Rahman | H02K 3/28 |
| 9,520,753 B2* | 12/2016 | Rahman | H02K 3/28 |
| 10,505,424 B2* | 12/2019 | Tamura | H02K 3/04 |
| 10,707,713 B2* | 7/2020 | Liang | H02K 15/0414 |
| 10,749,399 B2* | 8/2020 | Riedl | H02K 1/16 |
| 10,784,736 B2* | 9/2020 | Neet | H02K 3/48 |
| 11,056,943 B2* | 7/2021 | Rahman | H02K 3/14 |
| 2009/0273253 A1 | 11/2009 | Dobashi et al. | |
| 2011/0234031 A1* | 9/2011 | Kato | H02K 3/28 |
| | | | 310/71 |
| 2014/0033514 A1 | 2/2014 | Chamberlin et al. | |
| 2016/0285334 A1* | 9/2016 | Turnbull | H02K 3/50 |
| 2020/0235622 A1* | 7/2020 | Tian | H02K 1/16 |
| 2020/0235623 A1* | 7/2020 | Lin | H02K 15/0068 |
| 2021/0376678 A1* | 12/2021 | Herzberger | H02K 3/28 |

FOREIGN PATENT DOCUMENTS

| | | |
|---|---|---|
| CN | 107112838 A | 8/2017 |
| DE | 102013225130 | 6/2015 |
| JP | 2015149856 A | 8/2015 |

* cited by examiner

STATOR FOR AN ELECTRIC MACHINE

BACKGROUND OF THE INVENTION

The invention proceeds from a stator for an electric machine.

A stator for an electric machine is already known from DE 10 2013 225 130 A1, having a polyphase winding which is formed as an insert winding and which has winding strands assigned to a particular electrical phase, which winding strands run in each case in undulating fashion through grooves formed in the stator and are formed in each case from different types of conductor elements, wherein the conductor elements are arranged in the respective groove in a particular groove layer between a first or lowermost layer, facing toward a groove base, and an n-th or uppermost groove layer, averted from the groove base, wherein n corresponds to the number of conductor elements per groove and is an even number, wherein the conductor elements are in each case connected to one another by cohesive joining connections on both face sides of the stator. The grooves of the stator contain in each case only two conductor elements of the insert winding. This impedes the adaptation of the torque and of the power of the electric machine to the respective vehicles in which the electric machine is intended to be used. Furthermore, this low number of conductor elements per groove leads to relatively high current displacement losses.

SUMMARY OF THE INVENTION

The stator according to the invention for an electric machine having the characterizing features of the main claim has the advantage over this that an arrangement of the insert winding in the grooves of the stator is achieved which can comprise at least four conductor elements per groove. It has been found that, in this way, greater possibilities exist for easily adapting the torque and the power of the electric machine to the respective requirements without modifying the basic construction of the electric winding.

Furthermore, the greater number of conductor elements per groove leads to lower current displacement losses and thus to higher efficiency of the electric machine. With the concept according to the invention of the electric insert winding, high variability is thus achieved with regard to the number of conductor elements per groove, a setting width of the conductor elements and an interconnection of the conductor elements.

These advantages are achieved according to the invention in a stator which comprises the features of claim 1. In particular, each winding strand has a sequence of multiple first winding portions and a sequence of multiple second winding portions connected to the sequence of first winding portions, wherein, in each first winding portion and in each second winding portion, there is alternation in each case between the same two adjacent groove layers. Furthermore, each first or second winding portion respectively with respect to the groove layer is connected to the immediately overlying or immediately underlying first or second winding portion respectively by means of a connection of two layer connector conductor elements, and the uppermost or lowermost first winding portions respectively with respect to the groove layer are connected in each case by means of a reversal connector conductor element to one of the uppermost or lowermost second winding portions respectively such that the sequence of second winding portions runs in the opposite circumferential direction in relation to the sequence of first winding portions. According to the invention, the reversal connector conductor elements have in each case one reversal limb which is situated in the uppermost or lowermost groove layer and whose connecting portions, projecting out of the respective groove on both sides, run in the same circumferential direction.

By means of the profile according to the invention of the insert winding, in each case one winding head which is of highly uniform or regular construction as viewed over the circumference and which can be produced very easily in terms of manufacturing is realized at both face sides. This reduces the production costs for the stator according to the invention.

The insert winding according to the invention is formed at least predominantly from bar-shaped or I-shaped conductor elements which have in each case a single limb situated in one of the grooves of the stator, which limb is in each case angled at its two limb portions projecting out of the respective groove. The production of such bar-shaped or I-shaped conductor elements is easier and less expensive than the production of U-shaped conductor elements. On one of the two face sides of the stator, all conductor elements perform a layer step by one layer.

The reversal limbs of the reversal connector conductor elements are, in each case at their two connecting portions, connected on one side by means of a first reversal connection to a conductor limb, situated in a second-uppermost or second-lowermost groove layer, of an uppermost or lowermost first or second winding portion and on the other side by means of a second reversal connection to a conductor limb, situated in the same groove layer, of an uppermost or lowermost second or first winding portion, wherein the interval width of the second reversal connection differs from, in particular is smaller than, the interval width of the first reversal connection in the case of a shortened reversal connector conductor element by one groove, and is equal in the case of an unshortened reversal connector conductor element.

The first exemplary embodiment makes it possible for each winding strand to have a particular number of at least two parallel winding branches. Furthermore, each parallel winding branch according to the first exemplary embodiment comprises a single sequence of multiple first winding portions and a single sequence of multiple second winding portions.

According to the first exemplary embodiment, a sequence of multiple first winding portions of a first winding branch is provided in each case in a first set of grooves and a sequence of multiple second winding portions of the same first winding branch is provided in each case in a second set of grooves. In this way, the first set of grooves and the second set of grooves are half-filled or half-occupied with conductor elements. The first set of grooves is offset with respect to the second set of grooves in each case by one groove. Furthermore, a sequence of multiple first winding portions of a parallel second winding branch of the same winding strand is provided in each case in the first set of grooves and a sequence of multiple second winding portions of the same second winding branch is provided in each case in the second set of grooves, such that the first set of grooves and the second set of grooves is now completely filled or occupied with conductor elements.

For each winding branch, the in each case uppermost first or second winding portion respectively is connected by means of a shortened reversal connector conductor element to an uppermost second or first winding portion respectively and the in each case lowermost first or second winding portion respectively is connected by means of a further shortened reversal connector conductor element to a lowermost second or first winding portion respectively. In this way, the two ends of the sequence of multiple first winding portions are connected by means of the two reversal connector conductor elements to the two ends of the sequence of multiple second winding portions. This makes it possible to realize a layer-symmetrical and phase-symmetrical winding with multiple parallel branches.

Each winding branch has two shortened reversal connector conductor elements, of which one shortened reversal connector conductor element is arranged in one of the cophasal grooves of a magnetic pole in the uppermost groove layer and the other shortened reversal connector conductor element is arranged in the lowermost groove layer of the other cophasal groove of the same magnetic pole, or vice versa.

According to a first configuration of the first exemplary embodiment, the winding strand may have a pair of parallel winding branches, wherein the shortened reversal connector conductor elements of one winding branch are arranged in the groove layer, provided in accordance with the invention, of the corresponding cophasal grooves of a first magnetic pole and the shortened reversal connector conductor elements of the other winding branch are arranged in the groove layer, provided in accordance with the invention, of the corresponding cophasal grooves of a second magnetic pole which is adjacent to the first magnetic pole. For further configurations of the first exemplary embodiment, further pairs of winding branches may be arranged so as to be distributed symmetrically over the circumference of the electric machine. Accordingly, the winding strand may have two pairs of winding branches, wherein the shortened reversal connector conductor elements of the first pair of parallel winding branches are arranged in the corresponding cophasal grooves of two adjacent first magnetic poles and the shortened reversal connector conductor elements of the second pair of parallel winding branches are arranged in the corresponding cophasal grooves of two adjacent magnetic poles which are offset by 180 degrees with respect to the adjacent first magnetic poles. Furthermore, the winding strand may have four pairs of winding branches, wherein the shortened reversal connector conductor elements of the first pair of parallel winding branches are arranged in the corresponding cophasal grooves of two adjacent first magnetic poles and the shortened reversal connector conductor elements of the second, third and fourth pairs of parallel winding branches are arranged in the corresponding cophasal grooves of two adjacent magnetic poles which are offset by 90 or 180 or 270 degrees respectively with respect to the adjacent first magnetic poles.

According to the second exemplary embodiment, each winding strand has a single winding branch. Said single winding branch comprises a sequence of multiple first winding portions, a sequence of multiple second winding portions, a further sequence of multiple first winding portions and a further sequence of multiple second winding portions, for example in the stated sequence. Here, the sequence of multiple first winding portions may be provided in a first set of grooves and the sequence of multiple second winding portions may be provided so as to run in the opposite direction in the first set of grooves, in order to completely fill the first set of grooves. In this case, the further sequence of multiple first winding portions is provided in a second set of grooves and the further sequence of multiple second winding portions is provided so as to run in the opposite direction in the second set of grooves, in order to completely fill the second set of grooves. Alternatively, the sequence of multiple first winding portions may be provided in a first set of grooves and the sequence of multiple second winding portions may be provided so as to run in the opposite direction in a second set of grooves, in order to in each case half-fill or half-occupy the first set and the second set of grooves. In this alternative case, the further sequence of multiple first winding portions is provided in the first set of grooves and the further sequence of multiple second winding portions is provided so as to run in the opposite direction in the second set of grooves, in order to completely fill or occupy the first set and the second set of grooves.

In the second exemplary embodiment, each winding strand has two shortened reversal connector conductor elements and two unshortened reversal connector conductor elements, wherein one of the shortened reversal connector conductor elements is arranged in the uppermost groove layer and one of the unshortened reversal connector conductor elements is arranged in the lowermost groove layer in the same groove of a magnetic pole, or vice versa. Furthermore, the further shortened reversal connector conductor element is arranged in the uppermost groove layer and the further unshortened reversal connector conductor element is arranged in the lowermost groove layer, or vice versa, specifically in adjacent cophasal grooves in the adjacent magnetic pole.

It is furthermore advantageous if each first and/or second winding portion alternates between the same two adjacent groove layers until the two groove layers have in each case been run through a certain number N of times, wherein N is calculated from N=2p/a, and wherein 2p denotes the number of magnetic poles and a denotes the number of parallel winding branches per winding strand. In this way, a layer-symmetrical and phase-symmetrical winding with multiple parallel branches is realized.

For both exemplary embodiments, the layer conductor elements may have in each case one single limb situated in one of the grooves and ends angled in each case in opposite circumferential directions, wherein, in the case of a connection of two layer conductor elements, there is a resulting particular interval width, in particular of one to seven, and a layer step by one layer. Furthermore, the layer connector conductor elements may be formed in each case as a layer conductor element and connect in each case two first winding portions or two second winding portions to one another and in so doing perform a layer step by one layer.

It is highly advantageous if, in one of the exemplary embodiments, on one of the two face sides of the stator, there are provided exclusively connections of conductor elements with a layer step by one layer and with the same interval width. In this way, on said one face side of the stator, an absolutely uniform or symmetrical winding head is realized, and on the other face side, a substantially uniform or symmetrical winding head is realized.

It is also advantageous if the winding branches of the winding strands have in each case two ends at which in each case one phase input or output is provided, wherein the phase inputs and outputs of all winding branches are, as viewed in a circumferential direction, arranged in a circular-segment-shaped region of two adjacent magnetic poles and are formed in particular as layer conductor elements. In this way, the phase inputs and outputs for the electrical phases u, v, w can be accommodated in a small structural space and thus in a space-saving manner.

BRIEF DESCRIPTION OF THE DRAWINGS

Two exemplary embodiments of the invention are illustrated in simplified form in the drawing and will be discussed in more detail in the following description.

DETAILED DESCRIPTION

Figure 1:
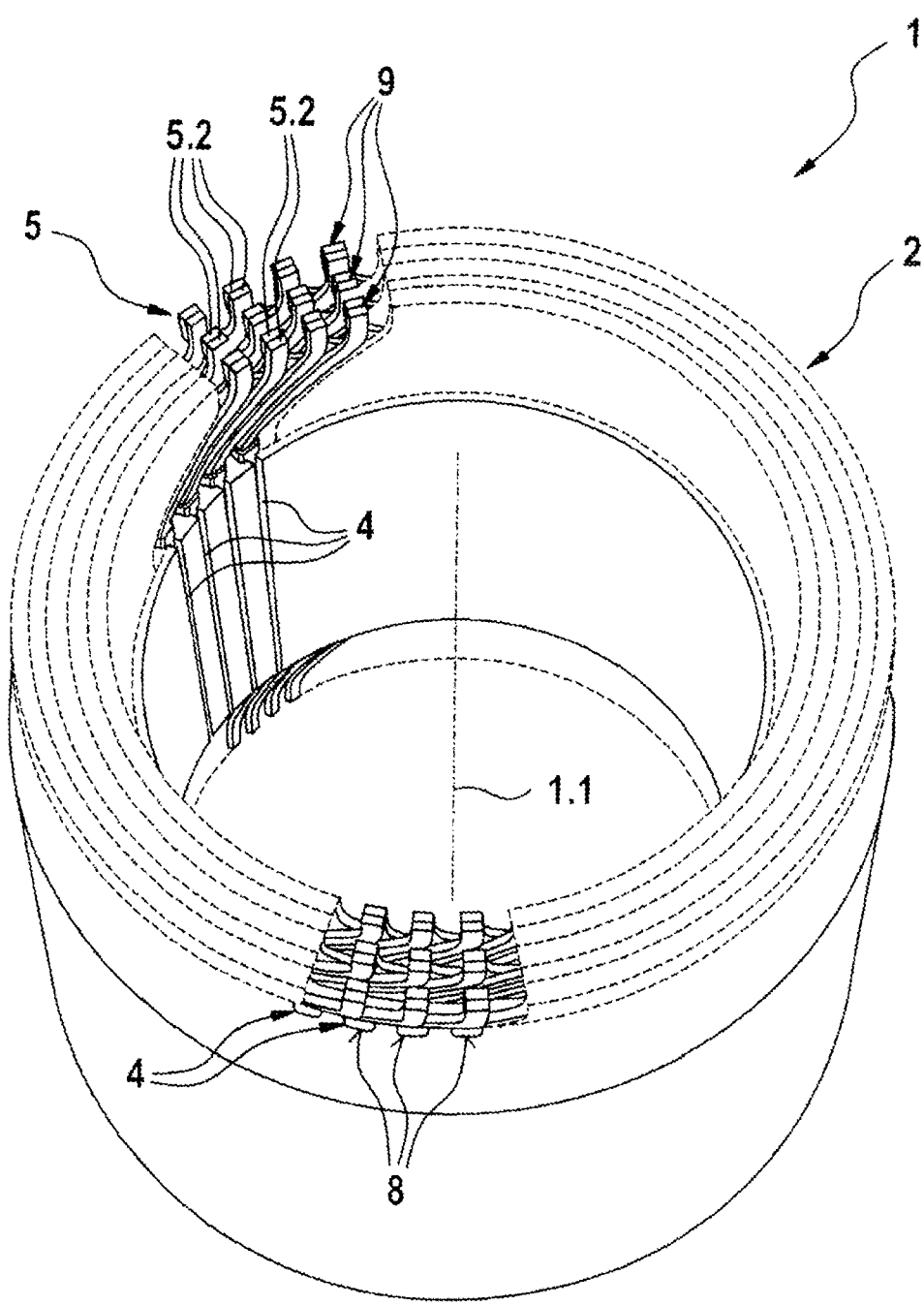
FIG. 1 shows a view of a stator of an electric machine with an insert winding according to the invention.

FIG. 1 shows a view of a stator of an electric machine with an insert winding according to the invention.

The stator 1 according to the invention of an electric machine has a polyphase winding 2 which is in the form of a so-called insert winding and which comprises winding strands 3 assigned to a particular electrical phase u, v, w. The winding strands 3 run in each case in undulating fashion through grooves 4 formed in the stator 1. The grooves 4 are arranged on the circumference of the stator 1 and run in each case in an axial direction with respect to a stator axis 1.1 of the stator 1. The winding strands 3 are formed in each case from different types of conductor elements 5. The polyphase winding 2 is designed so as to give rise to a particular number of holes q of, for example, equal to two. The individual conductor elements 5 of the polyphase winding 2 are arranged in their associated groove 4 in each case in a particular groove layer between a first or lowermost layer, facing toward a groove base 8, and an n-th or uppermost groove layer, averted from the groove base 8, wherein n corresponds to the number of conductor elements 5 per groove 4 and is an even number. The individual conductor elements 5 of the polyphase winding 2 are in each case connected to one another at their conductor ends 5.2 by cohesive joining connections 9, for example welded or soldered connections, such that the individual winding strands 3 are formed. For this purpose, the conductor ends 5.2 of the conductor elements 5 are correspondingly deformed, in particular angled or set, by means of a so-called setting tool. The joining connections 9 are provided for example on both face sides of the stator 1.

Figure 2:
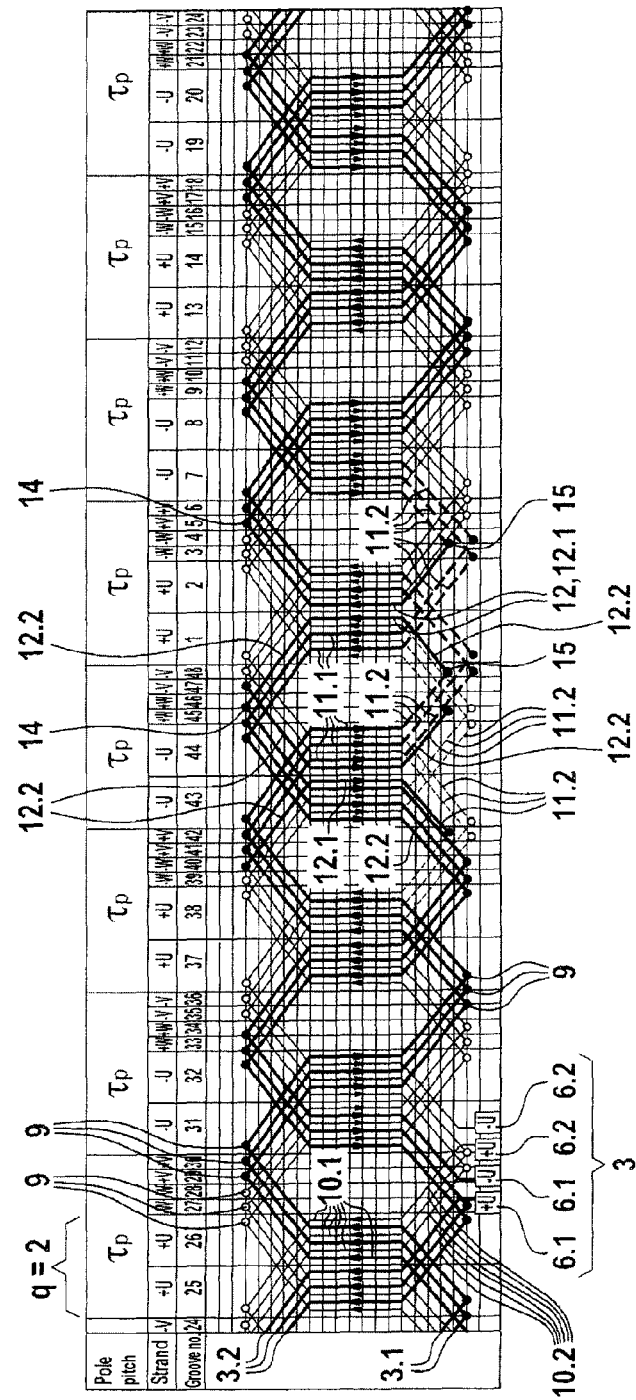
FIG. 2 shows a winding diagram for a winding strand 3, assigned to the phase u, of the polyphase winding 2 according to the invention according to a first exemplary embodiment.

FIG. 2 shows a winding diagram for a winding strand 3, which is assigned to the phase u and which has two parallel winding branches 6.1, 6.2, of the polyphase winding 2 according to the invention according to a first exemplary embodiment.

The winding diagram illustrates the profile of the winding strand 3 in the stator 1 as a line, wherein the first winding branch 6.1 of the winding strand 3 is drawn as a bold line, and the other winding branch 6.2 of the winding strand 3 is drawn as a thin line.

Those portions of the winding strand 3 which run in grooves 4 of the stator 1 are illustrated as running vertically in columns of the winding diagram. Those portions of the winding strand 3 which are angled from the vertically running portions run in each case outside the grooves 4 and, in the so-called winding head, are interconnected by means of the joining connections 9 to form the winding strand 3. In the first exemplary embodiment, six conductor limbs 5.1 are provided per groove 4 by way of example.

The joining connections 9 are illustrated in the winding diagram as a point or filled circle. Crossings of lines which have no joining connections 9 illustrated as points expressly do not represent a conductor connection.

Each winding strand 3 of the polyphase winding 2 according to the invention has at least one sequence of multiple first winding portions 3.1 arranged directly one behind the other and at least one sequence of multiple second winding portions 3.2 which are arranged directly one behind the other and which are connected to the sequence of first winding portions 3.1. The second winding portions 3.2 run in the opposite circumferential direction in relation to the first winding portions 3.1. In the winding diagram in FIG. 2, those winding portions which run from left to right are denoted as first winding portions 3.1 and those winding portions which run from right to left are denoted as second winding portions 3.2.

Figure 3:
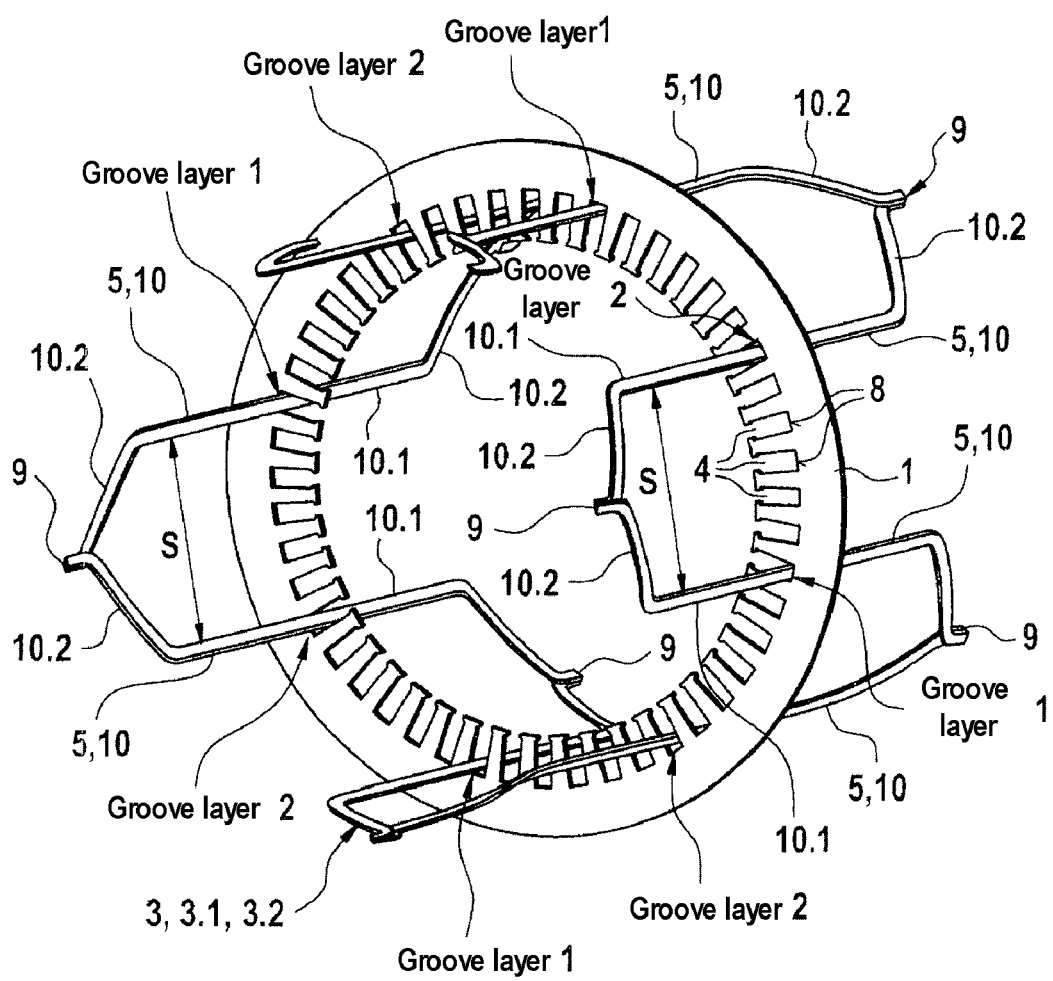
FIG. 3 shows an individual winding portion of the winding strand as per FIG. 2.

FIG. 3 shows, by way of example, an individual winding portion of the winding strand as per FIG. 2, which may be a first winding portion 3.1 or a second winding portion 3.2. For the purposes of the illustration, only a single lamination of the stator 1 is shown in FIG. 3.

Each first and each second winding portion 3.1, 3.2 comprises, between its ends, a first type of conductor elements 5, hereinafter referred to as layer conductor elements 10. By way of example, the first and second winding portions 3.1, 3.2 are, between their ends (excluding the ends themselves), formed in each case exclusively from the same layer conductor elements 10. The layer conductor elements 10 have in each case a single conductor limb 10.1 situated in one of the grooves 4 and conductor ends 10.2 angled in each case in opposite circumferential directions and situated outside the grooves 4. In the case of a connection of two layer conductor elements 5, there is in each case a resulting particular interval width S, for example of one to seven, and a groove layer step by one layer. For example, two layer conductor elements 5 which are cohesively connected to one another form a single undulation of one of the winding strands 3 running in undulating fashion.

The groove layer of the conductor limbs 5.1 of the conductor elements 5 in the respective groove 4 is determined, in the winding diagram as per FIG. 2, in each case from the arrangement thereof in the respective column. In each column, the lowermost groove layer is illustrated on the far left, and the uppermost groove layer is illustrated on the far right. In the winding diagram, each groove 4 is assigned a groove number. In each magnetic pole $\tau_p$ of the stator 1, two adjacent grooves 4 are occupied exclusively by conductor elements 5 which are assigned to the same electrical phase u, v, w, resulting in the number of holes q equal to two.

In each first winding portion 3.1 and in each second winding portion 3.2, there is in each case multiple alternation between the same two adjacent groove layers. Each first and/or second winding portion 3.1, 3.2 alternates between the same two adjacent groove layers until the two groove layers have in each case been run through a certain number N of times, wherein the number N is calculated from N=2p/a, wherein 2p is the number of magnetic poles $\tau_p$ and a is the number of parallel winding branches 6 per winding strand 3.

Figure 4:
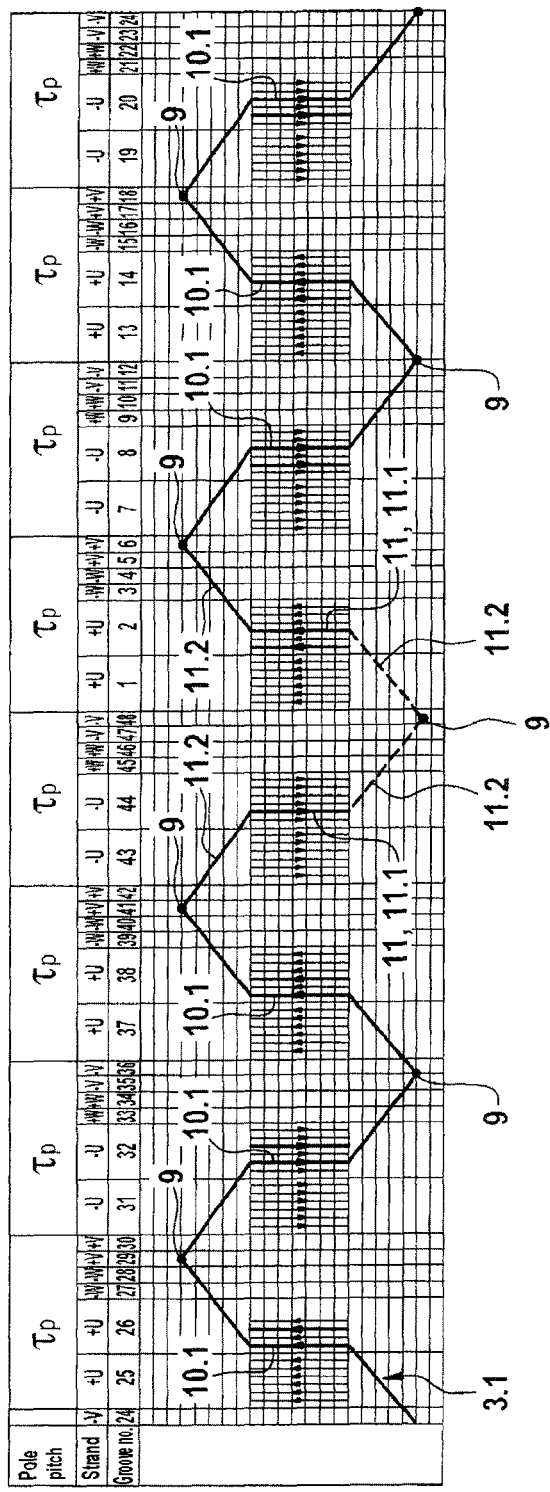
FIG. 4 shows a winding diagram for an exemplary sequence of two winding portions as per FIG. 2.

FIG. 4 shows a winding diagram for an exemplary sequence of two winding portions, which may be two first winding portions 3.1 as per FIG. 2 or two second winding portions 3.2 as per FIG. 2. In the example as per FIG. 4, a winding portion that alternates between the groove layers one and two, and a following winding portion which alternates between the groove layers three and four, are shown.

According to the invention, in the sequence of multiple first winding portions 3.1, multiple first winding portions 3.1 are arranged directly one behind the other, wherein said multiple first winding portions 3.1 are arranged in each case in different groove layers. In other words, a groove layer change thus takes place in each case from one first winding portion 3.1 to the next first winding portion 3.1 of the same sequence, for example a groove layer change from the groove layer two to the groove layer three in the example as per FIG. 4. This groove layer change is achieved by virtue of the two first winding portions 3.1 which are connected to one another having, at their ends facing toward one another, in each case one second type of conductor element 5, hereinafter referred to as layer connector conductor element 11. Each first winding portion 3.1 is thus connected to a radially immediately overlying or immediately underlying first winding portion 3.1 of the same sequence by means of a connection of two layer connector conductor elements 11, wherein the connection of two layer connector conductor elements 11 is illustrated in each case by dashed lines in FIG. 2.

The layer connector conductor elements 11 are for example of the same design as the layer conductor elements 5, but deformed or set differently at their conductor ends 11.2. The connection of two layer connector conductor elements 11 effects the groove layer change by one layer with respect to the associated other winding portion 3.1. The sequence of first winding portions 3.1 runs, for example, proceeding from the two lowermost groove layers as far as into the two uppermost groove layers.

The sequence of second winding portions 3.2 is formed in the same way as the sequence of first winding portions 3.1, such that the multiple second winding portions 3.2 of the same sequence are also arranged in each case in different groove layers, and the two second winding portions 3.2 which are connected to one another have at their ends in each case one of the layer connector conductor elements 11. Each second winding portion 3.2 is thus connected to a radially immediately overlying or immediately underlying second winding portion 3.2 of the same sequence by means of a connection of two layer connector conductor elements 11. The sequence of second winding portions 3.2 runs for example proceeding from the two uppermost groove layers as far as into the two lowermost groove layers.

In the first exemplary embodiment, each winding strand 3 comprises a particular number of parallel winding branches 6, for example two parallel winding branches 6. Here, provision is made whereby each parallel winding branch 6 comprises a single sequence of multiple first winding portions 3.1 and a single sequence of multiple second winding portions 3.2.

Figure 5:
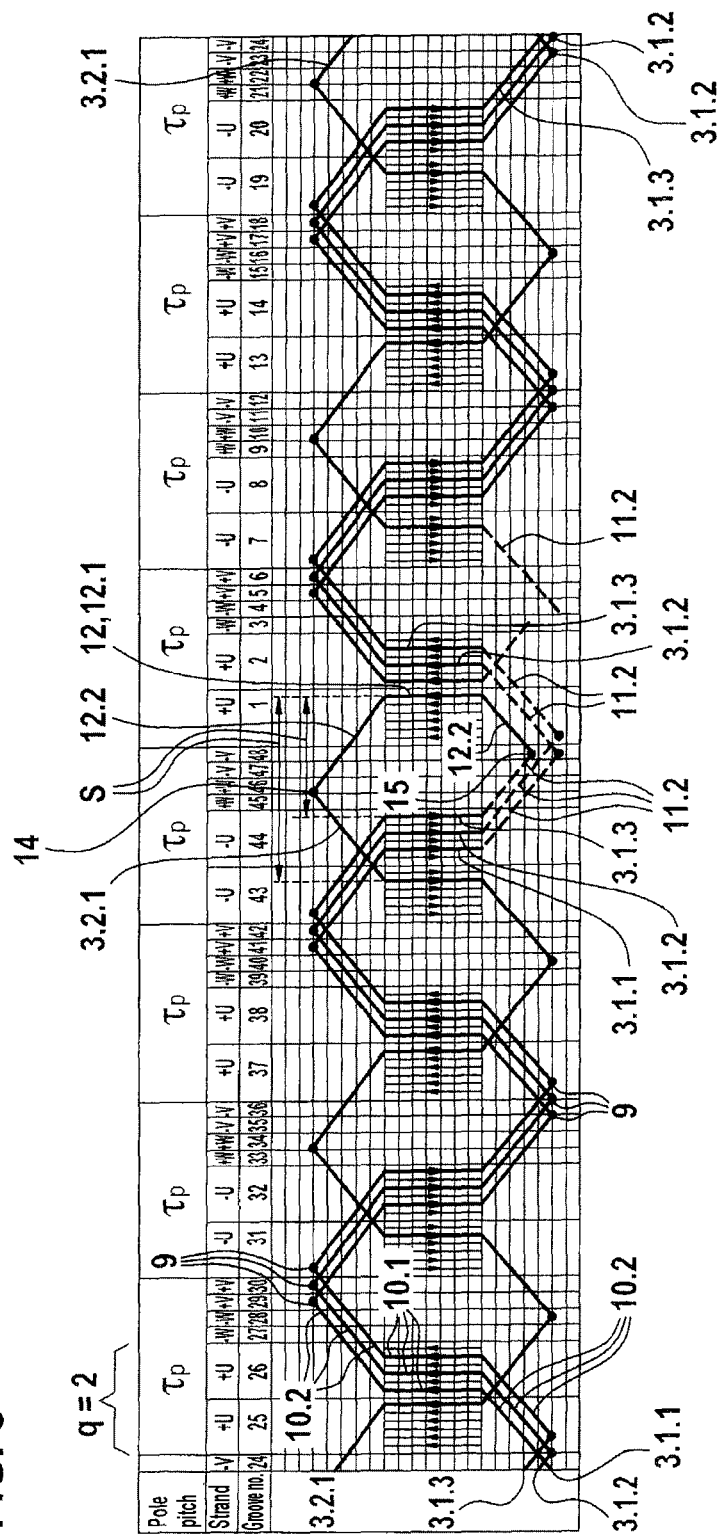
FIG. 5 shows a winding diagram for a part of the winding branch 6.1 as per FIG. 2.

FIG. 5 shows a winding diagram for a part of the winding branch 6.1 as per FIG. 2, specifically a complete sequence of three first winding portions 3.1.1, 3.1.2, 3.1.3 as per FIG. 2 and one second winding portion 3.2.1 as part of the sequence of multiple second winding portions 3.2 shown in FIG. 2. In order to be able to more quickly ascertain the groove layer in each column, groove layers not occupied by conductors in each column which has a groove number are provided with a line with an arrow.

According to the invention, the radially uppermost first winding portion 3.1.3 of a winding branch 6 is connected in each case by means of a third type of conductor element 5, hereinafter referred to as reversal connector conductor element 12, to a radially uppermost second winding portion 3.2.1 of the same winding branch 6 such that the uppermost second winding portion 3.2.1 runs in the opposite circumferential direction in relation to the uppermost first winding portion 3.1.3, or the sequence of second winding portions 3.2 runs in the opposite circumferential direction in relation to the sequence of first winding portions 3.1. The reversal connector conductor element 12 is in this case provided with a reversal limb 12.1 in the uppermost groove layer.

The layer conductor element 5 forming that end of the first winding portion 3.1 which faces toward the reversal connector conductor element 12 is likewise provided in the uppermost groove layer.

Furthermore, the radially lowermost first winding portion 3.1 of a winding strand 3 or winding branch 6 is connected in each case by means of one of the reversal connector conductor elements 12 to a lowermost second winding portion 3.2 of the same winding strand 3 or winding branch 6 such that the lowermost second winding portion 3.2 runs in the opposite circumferential direction in relation to the lowermost first winding portion 3.1. or the sequence of second winding portions 3.2 runs in the opposite circumferential direction in relation to the sequence of first winding portions 3.1. The reversal connector conductor element 12 is in this case provided with a reversal limb 12.1 in the lowermost groove layer.

Figure 6:
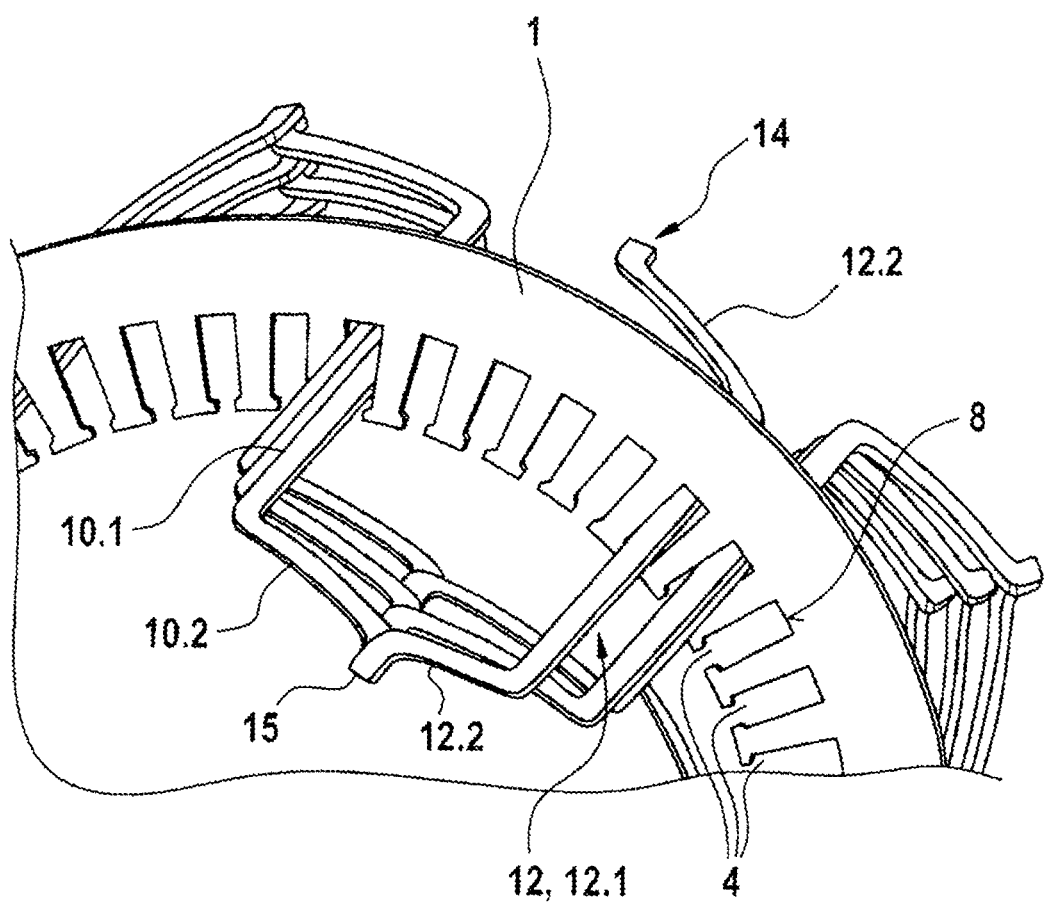
FIG. 6 shows a shortened reversal connector conductor element 12 of the insert winding according to the invention as per FIG. 1 and FIG. 2.

FIG. 6 shows a shortened reversal connector conductor element 12 of the insert winding according to the invention as per FIG. 1 and FIG. 2. For the purposes of the illustration, only a single lamination of the stator 1 is shown in FIG. 6.

The reversal limbs 12.1 of the reversal connector conductor elements 12 have connecting portions 12.2 projecting out of the respective groove 4 in each case on both sides, which connecting portions run in the same circumferential direction with respect to the stator axis 1.1 as viewed from the same direction or from the same face side of the stator 1. For example, the reversal connector conductor elements 12 have in each case only a single limb 12.1 situated in one of the grooves 4. Alternatively, the reversal connector conductor elements 12 could for example also be of U-shaped design and have in each case two limbs situated in grooves 4.

In the winding diagram in FIG. 2 and FIG. 5, the reversal limbs 12.1 of the reversal connector conductor elements 12 are, in each case at their two connecting portions 12.2, connected on one side by means of a first reversal connection 14 to a conductor limb 5.1, situated in another groove layer, of one of the first winding portions 3.1 and on the other side by means of a second reversal connection 15 to a conductor limb 5.1, situated in the same groove layer, of one of the second winding portions 3.2, wherein the interval width of the second reversal connection 15 differs from, for example is shortened by one groove in relation to, the interval width of the first reversal connection 14 as per the first exemplary embodiment.

The multiple first winding portions 3.1 of a first winding branch 6.1 are provided in each case in a first set of grooves 4 with the groove numbers 26, 32, 38, 44, 2, 8, 14, 20, and the multiple second winding portions 3.2 of the same first winding branch 6.1 are provided in each case in a second set of grooves 4 with the groove numbers 25, 31, 37, 43, 1, 7, 13, 19. The two sets of grooves 4 are, in the winding diagram in FIG. 2, illustrated as columns which are wider than the other columns.

The first set of grooves 4 is offset in relation to the second set of grooves 4 in each case by one groove. The multiple first winding portions 3.1 of a parallel second winding branch 6.2 of the same winding strand 3 are, as per the first exemplary embodiment in FIG. 2, provided in each case in the first set of grooves 4 and the multiple second winding portions 3.2 of the same second winding branch 6.2 are provided in each case in the second set of grooves 4. Here, for each winding branch 6.1, 6.2, the in each case uppermost first winding portion 3.1 is connected by means of a reversal connector conductor element 12 to an uppermost second winding portion 3.2, and the in each case lowermost first winding portion 3.1 is connected by means of a further reversal connector conductor element 12 to a lowermost second winding portion 3.2.

As per the first exemplary embodiment in FIG. 2, each winding branch 6.1, 6.2 has two reversal connector conductor elements 12, of which one reversal connector conductor element 12 is arranged in one of the cophasal grooves 4 of one of the magnetic poles $\tau_p$ in the uppermost groove layer and the other reversal connector conductor element 12 is arranged in the lowermost groove layer of the other cophasal groove 4 of the same magnetic pole $\tau_p$, or vice versa. If the winding strands 3, as in the first exemplary embodiment as per FIG. 2, have in each case one pair of parallel winding branches 6.1, 6.2, the reversal connector conductor elements 12 of one winding branch 6.1 in a first magnetic pole $\tau_p$ are arranged in the above-described groove layer and groove, and the reversal connector conductor elements 12 of the other winding branch 6.2 in a second magnetic pole $\tau_p$ adjacent to the first magnetic pole $\tau_p$ are arranged in the above-described groove layer and groove. If the winding strands 3 have in each case two pairs of winding branches 6, the reversal connector conductor elements 12 of the first pair of parallel winding branches 6 are, as described above, arranged in the corresponding cophasal grooves of two adjacent first magnetic poles $\tau_p$, and the reversal connector conductor elements 12 of the second pair of parallel winding branches 6 are, as described above, arranged in the corresponding cophasal grooves of two adjacent magnetic poles $\tau_p$ which are offset by 180 degrees with respect to the adjacent first magnetic poles $\tau_p$. If the winding strand 3 has four pairs of winding branches 6, the reversal connector conductor elements 12 of the first pair of parallel winding branches 6 are arranged in the corresponding cophasal grooves 4 of two adjacent first magnetic poles $\tau_p$ and the reversal connector conductor elements 12 of the second, third and fourth pairs of parallel winding branches 6 are, as described above, arranged in the corresponding cophasal grooves of two adjacent magnetic poles $\tau_p$ which are offset by 90 or 180 or 270 degrees respectively with respect to the adjacent first magnetic poles $\tau_p$.

On one of the two face sides of the stator 1, there are provided exclusively connections of conductor elements 5 with a layer step by one groove layer and with the same interval width S. In this way, on said face side of the stator, an absolutely uniform or symmetrical winding head is generated.

As per FIG. 2, the parallel winding branches 6 of the winding strands 3 have in each case two ends at which in each case one phase input or output +U, −U, +V, −V, +W, −W is provided, wherein the phase inputs and outputs +U, −U, +V, −V, +W, −W of all winding branches 3 are, as viewed in a circumferential direction of the stator 1, arranged in a circular-segment-shaped region of two adjacent magnetic poles $\tau_p$, and are formed as connection conductor elements 17. For example, the connection conductor elements 17 are designed similarly to the layer conductor elements 10.

The phase inputs and outputs +U, −U, +V, −V, +W, −W may be provided at any desired location of the respective winding strand 3 by virtue of one of the joining connections 9 which performs a groove layer change by one layer, and which would for example connect two layer conductor elements 10, not being produced, and the connecting portions 10.2 of the corresponding conductor elements 10 being connected to one of the electrical phases u, v, w.

Figure 7:
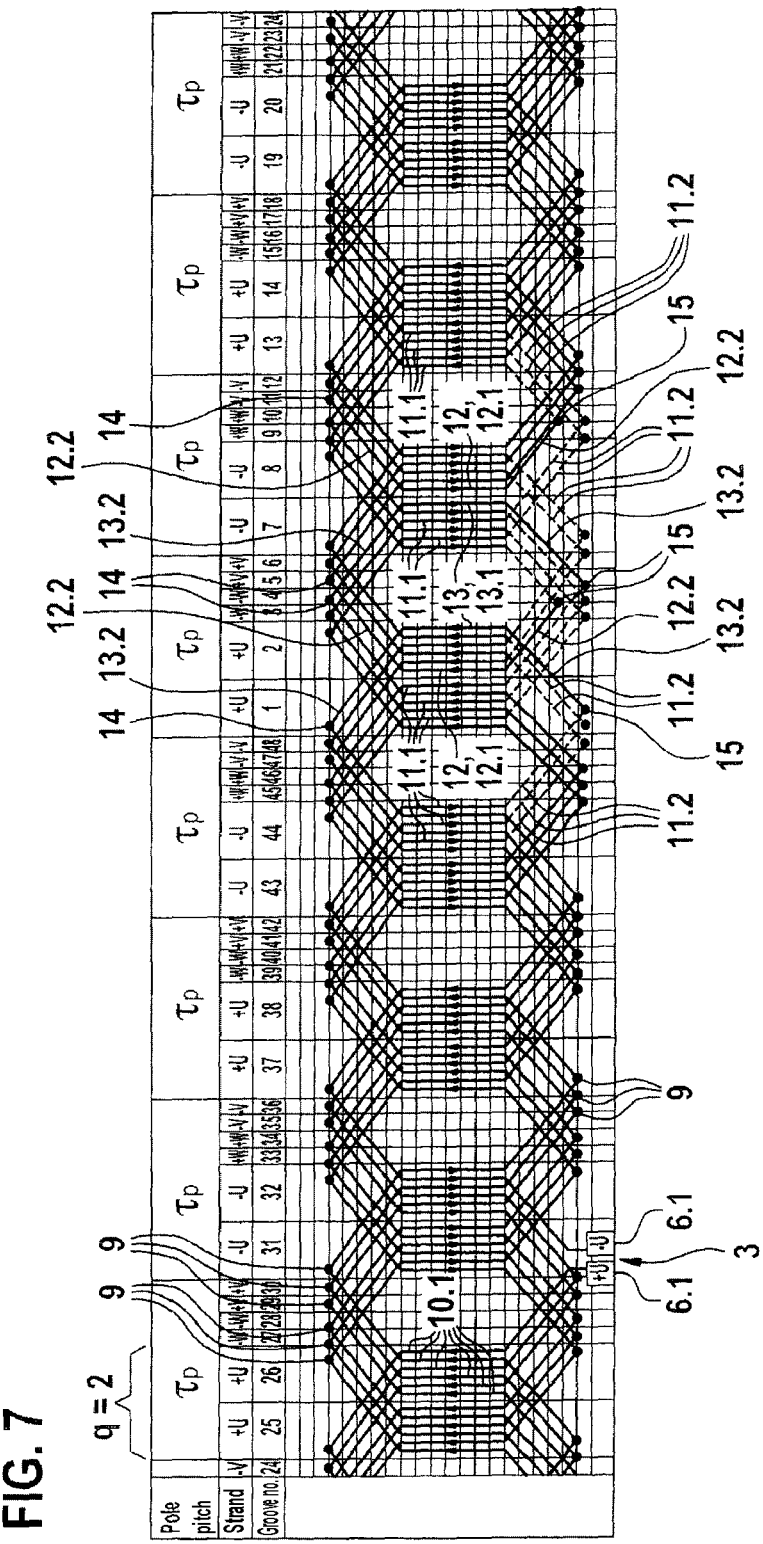
FIG. 7 shows a winding diagram for a winding strand 3, assigned to the phase u, of the polyphase winding 2 according to the invention with a single winding branch according to a second exemplary embodiment.

FIG. 7 shows a winding diagram for a winding strand 3, assigned to the phase u, of the polyphase winding 2 according to the invention with a single winding branch according to a second exemplary embodiment.

In the second exemplary embodiment, as in the first exemplary embodiment, it is for example the case that six conductor limbs 5.1 are provided per groove 4.

By contrast to the first exemplary embodiment, the second exemplary embodiment has winding strands 3 without parallel winding branches 6. Each winding strand 3 therefore comprises only a single winding branch 6. Said single winding branch 6 of each winding strand 3 comprises a sequence of multiple first winding portions 3.1, a sequence of multiple second winding portions 3.2, a further sequence of multiple first winding portions 3.1 and a further sequence of multiple second winding portions 3.2, for example in this stated sequence. The first winding portions 3.1 and the second winding portions 3.2 according to the second exemplary embodiment are designed similarly to those in the first exemplary embodiment.

The sequence of multiple first winding portions 3.1 is, as per FIG. 7, provided in the first set of grooves 4, and the sequence of multiple second winding portions 3.2 is provided so as to run in the opposite direction in the second set of grooves 4 and, following this, the further sequence of multiple first winding portions 3.1 is provided in the first set of grooves 4 and the further sequence of multiple second winding portions 3.2 is provided so as to run in the opposite direction in the second set of grooves 4. In the case of this alternative profile of the single winding branch 6 per winding strand 3, the sequence of multiple first winding portions 3.1 is connected by means of a shortened reversal connector conductor element 13 to the sequence of multiple second winding portions 3.2. The sequence of multiple second winding portions 3.2 is connected to the further sequence of multiple first winding portions 3.1 by means of an unshortened reversal connector conductor element 12. Furthermore, the further sequence of multiple first winding portions 3.1 is connected to the further sequence of multiple second winding portions 3.2 by means of a shortened reversal connector conductor element 13. Furthermore, the further sequence of multiple second winding portions 3.2 is connected by means of an unshortened reversal connector conductor element 12 to the sequence of multiple first winding portions 3.1.

Provision may alternatively be made for the sequence of multiple first winding portions 3.1 to run in a first set of grooves 4, for example with the groove numbers 26, 32, 38, 44, 2, 8, 14, 20, and for the sequence of multiple second winding portions 3.2 to run in the opposite direction in the same first set of grooves 4 with the groove numbers 26, 32, 38, 44, 2, 8, 14, 20 and, following this, for the further sequence of multiple first winding portions 3.1 to run in a second set of grooves 4, for example with the groove numbers 25, 31, 37, 43, 1, 7, 13, 19, and for the further sequence of multiple second winding portions 3.2 to run in the opposite direction in the same second set of grooves 4. In the case of this profile of the single winding branch 6 per winding strand 3, the sequence of multiple first winding portions 3.1 is connected by means of an unshortened reversal connector conductor element 12 to the sequence of multiple second winding portions 3.2. The sequence of multiple second winding portions 3.2 is connected to the further sequence of multiple first winding portions 3.1 by means of a shortened reversal connector conductor element 13. Furthermore, the further sequence of multiple first winding portions 3.1 is connected to the further sequence of multiple second winding portions 3.2 by means of an unshortened reversal connector conductor element 12. Furthermore, the further sequence of multiple second winding portions 3.2 is connected by means of a shortened reversal connector conductor element 13 to the sequence of multiple first winding portions 3.1.

Each single winding branch per winding strand 3 has two shortened reversal connector conductor elements 12 and two unshortened reversal connector conductor elements 13. Here, one of the shortened reversal connector conductor elements 12 is arranged in the uppermost groove layer and one of the unshortened reversal connector conductor elements 13 is arranged in the lowermost groove layer, or vice versa, specifically in the same groove, for example with the groove number 2, of a magnetic pole τp. Furthermore, the further shortened reversal connector conductor element 12 is arranged in the uppermost groove layer and the further unshortened reversal connector conductor element 13 is arranged in the lowermost groove layer, or vice versa, specifically in adjacent cophasal grooves, for example with the groove numbers 7 and 8, of the adjacent magnetic pole ($\tau_p$). Furthermore, the winding strands 3 are formed and arranged in the same way as in the first exemplary embodiment.

The single winding branch 6 per winding strand 3 has, as per FIG. 7, in each case two ends at which in each case one phase input or output +U, −U, +V, −V, +W, −W is provided, wherein the phase inputs and outputs +U, −U, +V, −V, +W, −W of all winding branches 3 are, as viewed in a circumferential direction of the stator 1, arranged in a circular-segment-shaped region of two adjacent magnetic poles $\tau_p$, and are formed in particular as layer conductor elements 10.

The phase inputs and outputs +U, −U, +V, −V, +W, −W may be provided at any desired location of the respective winding strand 3 by virtue of one of the joining connections 9 which performs a groove layer change by one layer, and which would for example connect two layer conductor elements 10, not being produced, and the connecting portions 10.2 of the corresponding conductor elements 10 being connected to one of the electrical phases u, v, w.

The invention claimed is:

1. A stator (1) for an electric machine, having a polyphase winding which is formed as an insert winding and which has winding strands (3) assigned to a particular electrical phase (u, v, w), which winding strands run in each case in undulating fashion through grooves (4) formed in the stator (1) and are formed in each case from different types of conductor elements (5, 10, 11, 12), and having a number of holes (q), wherein the conductor elements (5, 10, 11, 12) are arranged in a respective groove (4) in a particular groove layer between a first or lowermost layer, facing toward a groove base, and an n-th or uppermost groove layer, averted from the groove base, wherein n corresponds to the number of conductor elements (5, 10, 11, 12) per groove (4), is an even number, wherein the conductor elements (5, 10, 11, 12) are in each case connected to one another by cohesive joining connections (9) to form a respective winding strand (3), wherein each winding strand (3) has a sequence of multiple first winding portions (3.1) and a sequence of multiple second winding portions (3.2) connected to the sequence of first winding portions (3.1), wherein, in each first winding portion (3.1) and in each second winding portion (3.2), there is alternation in each case between the same two adjacent groove layers, wherein each first and second winding portion (3.1, 3.2) has ends and comprises layer conductor elements (10) between the ends, wherein each first or second winding portion (3.1, 3.2) respectively with respect to the groove layer is connected to an immediately overlying or immediately underlying first or second winding portion (3.1, 3.2) respectively by means of a connection of two layer connector conductor elements (11), and wherein uppermost or lowermost first winding portions (3.1, 3.2) respectively with respect to the groove layer are connected in each case by means of a reversal connector conductor element (12) to one of uppermost or lowermost second winding portions (3.2) respectively such that the sequence of second winding portions (3.2) runs in the opposite circumferential direction in relation to the sequence of first winding portions (3.1), wherein the reversal connector conductor elements (12, 13) have in each case one reversal limb (12.1, 13.1) which is situated in the uppermost or lowermost groove layer and connecting portions (12.2, 13.2) of which, projecting out of the respective groove (4) on both sides, run in the same circumferential direction with respect to the stator axis (1.1) as viewed from the same face side of the stator (1), situated in one of the grooves (4), of the reversal connector conductor element (12, 13).

2. The stator as claimed in claim 1, characterized in that the reversal limbs (12.1, 13.1) of the reversal connector conductor elements (12, 13) are, in each case at two connecting portions (12.2, 13.2), connected on one side by a first reversal connection (14) to a conductor limb, situated in a second-uppermost or second-lowermost groove layer, of an uppermost or lowermost winding portion (3.1, 3.2) and on the other side by a second reversal connection (15) to a conductor limb, situated in the same groove layer, of an uppermost or lowermost winding portion (3.1, 3.2), wherein the interval width (S) of the second reversal connection (15) differs from the interval width (S) of the first reversal connection (14) in the case of a shortened reversal connector conductor element (12) by one groove (4), and is equal in the case of an unshortened reversal connector conductor element (13).

3. The stator as claimed in claim 2, characterized in that each winding strand (3) has a number of at least two parallel winding branches (6, 6.1, 6.2), wherein each parallel winding branch (6) comprises a single sequence of multiple first winding portions (3.1) and a single sequence of multiple second winding portions (3.2).

4. The stator as claimed in claim 3, characterized in that a sequence of multiple first winding portions (3.1) of a first winding branch (6.1) is provided in each case in a first set of grooves (4) and a sequence of multiple second winding portions (3.2) of the same first winding branch (6.1) is provided in each case in a second set of grooves (4), wherein the first set of grooves (4) is offset with respect to the second set of grooves (4) in each case by one groove (4), wherein a sequence of multiple first winding portions (3.1) of a parallel first winding branch (6.2) of the same winding strand (3) is provided in each case in the first set of grooves (4) and a sequence of multiple second winding portions (3.2) of the same second winding branch (6.2) is provided in each case in the second set of grooves (4), wherein, for each winding branch (6.1, 6.2), the in each case uppermost first or second winding portion (3.1, 3.2) respectively is connected by means of a shortened reversal connector conductor element (12) to an uppermost second or first winding portion (3.2, 3.1) respectively and the in each case lowermost first or second winding portion (3.1, 3.2) respectively is connected by means of a further shortened reversal connector conductor element (12) to a lowermost second or first winding portion (3.2, 3.1) respectively.

5. The stator as claimed in claim 3, characterized in that each winding branch (3.1, 3.2) has two shortened reversal connector conductor elements (12), of which one shortened reversal connector conductor element (12) is arranged in one of the cophasal grooves (4) of a magnetic pole ($\tau_p$) in the uppermost groove layer and the other shortened reversal connector conductor element (12) is arranged in the lowermost groove layer of the other cophasal groove (4) of the same magnetic pole ($\tau_p$), or vice versa.

6. The stator as claimed in claim 5, characterized in that the winding strand (3) has a pair of parallel winding branches (6, 6.1, 6.2), wherein the shortened reversal connector conductor elements (12) of one winding branch (6.1) are arranged in the corresponding groove layer of the corresponding cophasal grooves of a first magnetic pole ($\tau_p$) and the shortened reversal connector conductor elements (12) of the other winding branch (6.2) are arranged in the corresponding groove layer of the corresponding cophasal grooves (4) of a second magnetic pole ($\tau_p$) which is adjacent to the first magnetic pole ($\tau_p$), or in that the winding strand (3) has two pairs of winding branches (6), wherein the shortened reversal connector conductor elements (12) of the first pair of parallel winding branches (6) are arranged in the corresponding cophasal grooves (4) of two adjacent first magnetic poles ($\tau_p$) and the shortened reversal connector conductor elements (12) of the second pair of parallel winding branches (6) are arranged in the corresponding cophasal grooves (4) of two adjacent magnetic poles ($\tau_p$) which are offset by 180 degrees with respect to the adjacent first magnetic poles ($\tau_p$), or in that the winding strand (3) has four pairs of winding branches (6), wherein the shortened reversal connector conductor elements (12) of the first pair of parallel winding branches (6) are arranged in the corresponding cophasal grooves of two adjacent first magnetic poles ($\tau_p$) and the shortened reversal connector conductor elements (12) of the second, third and fourth pairs of parallel winding branches (6) are arranged in the corresponding cophasal grooves (4) of two adjacent magnetic poles ($\tau_p$) which are offset by 90 or 180 or 270 degrees respectively with respect to the adjacent first magnetic poles ($\tau_p$).

7. The stator as claimed in claim 1, characterized in that each winding strand (3) has a single winding branch (6), wherein the single winding branch (6) comprises a sequence of multiple first winding portions (3.1), a sequence of multiple second winding portions (3.2), a further sequence of multiple first winding portions (3.1) and a further sequence of multiple second winding portions (3.2).

8. The stator as claimed in claim 7, characterized in that the sequence of multiple first winding portions (3.1) is provided in a first set of grooves (4) and the sequence of multiple second winding portions (3.2) is provided so as to run in the opposite direction in the first set of grooves (4), and, following this, the further sequence of multiple first winding portions (3.1) is provided in a second set of grooves (4) and the further sequence of multiple second winding portions (3.2) is provided so as to run in the opposite direction in the second set of grooves (4).

9. The stator as claimed in claim 7, characterized in that the sequence of multiple first winding portions (3.1) is provided in a first set of grooves (4) and the sequence of multiple second winding portions (3.2) is provided so as to run in the opposite direction in a second set of grooves (4) and, following this, the further sequence of multiple first winding portions (3.1) is provided in the first set of grooves (4) and the further sequence of multiple second winding portions (3.2) is provided so as to run in the opposite direction in the second set of grooves (4).

10. The stator as claimed in claim 8, characterized in that the sequence of multiple first winding portions (3.1) of a winding strand (3) is connected by means of an unshortened reversal connector conductor element (12) to the sequence of multiple second winding portions (3.2), wherein the sequence of multiple second winding portions (3.2) is connected to the further sequence of multiple first winding portions (3.1) by means of a shortened reversal connector conductor element (13), wherein the further sequence of multiple first winding portions (3.1) is connected to the further sequence of multiple second winding portions (3.2) by means of an unshortened reversal connector conductor element (12), and wherein the further sequence of multiple second winding portions (3.2) is connected by means of a shortened reversal connector conductor element (13) to the sequence of multiple first winding portions (3.1).

11. The stator as claimed in claim 7, characterized in that each winding strand (3) has two shortened reversal connector conductor elements (12) and two unshortened reversal connector conductor elements (13), wherein one of the shortened reversal connector conductor elements (12) is arranged in the uppermost groove layer and one of the unshortened reversal connector conductor elements (13) is arranged in the lowermost groove layer in the same groove of a magnetic pole ($\tau_p$), or vice versa, and wherein the further shortened reversal connector conductor element (12) is arranged in the uppermost groove layer and the further unshortened reversal connector conductor element (13) is arranged in the lowermost groove layer, or vice versa, in adjacent cophasal grooves of the adjacent magnetic pole ($\tau_p$).

12. The stator as claimed in claim 1, characterized in that each first and/or second winding portion (3.1, 3.2) alternates between the same two adjacent groove layers until the two groove layers have in each case been run through a certain number N of times, wherein N is calculated from N=2p/a, wherein 2p is the number of magnetic poles ($\tau_p$) and a is the number of parallel winding branches (6) per winding strand (3).

13. The stator as claimed in claim 1, characterized in that the layer conductor elements (10) have in each case one single conductor limb (10.1) situated in one of the grooves (4) and conductor ends (10.2) angled in each case in opposite circumferential directions, wherein, in the case of a connection of two layer conductor elements (10), there is a resulting particular interval width (S), in particular of one to seven, and a layer step by one layer, and/or in that the layer connector conductor elements (11) are formed in each case as a layer conductor element (10) and connect in each case two first winding portions (3.1) or two second winding portions (3.2) to one another and in so doing perform a layer step by one layer.

14. The stator as claimed in claim 1, characterized in that, on one of the two face sides of the stator (1), there are provided exclusively connections of conductor elements (10) with a layer step by one layer and with the same interval width (S).

15. The stator as claimed in claim 1, characterized in that the winding branches (6) of the winding strands (3) have in each case two ends at which in each case one phase input or output is provided, wherein the phase inputs and outputs of all winding branches are, as viewed in a circumferential direction, arranged in a circular-segment-shaped region of two adjacent magnetic poles.

16. The stator as claimed in claim 1, characterized in that the reversal limbs (12.1, 13.1) of the reversal connector conductor elements (12, 13) are, in each case at two connecting portions (12.2, 13.2), connected on one side by a first reversal connection (14) to a conductor limb, situated in a second-uppermost or second-lowermost groove layer, of an uppermost or lowermost winding portion (3.1, 3.2) and on the other side by a second reversal connection (15) to a conductor limb, situated in the same groove layer, of an uppermost or lowermost winding portion (3.1, 3.2), wherein the interval width (S) of the second reversal connection (15) is smaller than the interval width (S) of the first reversal connection (14) in the case of a shortened reversal connector conductor element (12) by one groove (4), and is equal in the case of an unshortened reversal connector conductor element (13).

17. The stator as claimed in claim 1, characterized in that each winding strand (3) has a single winding branch (6), wherein the single winding branch (6) comprises a sequence of multiple first winding portions (3.1), a sequence of multiple second winding portions (3.2), a further sequence of multiple first winding portions (3.1) and a further sequence of multiple second winding portions (3.2) in the stated sequence.

18. The stator as claimed in claim 1, characterized in that the winding branches (6) of the winding strands (3) have in each case two ends at which in each case one phase input or output is provided, wherein the phase inputs and outputs of all winding branches are, as viewed in a circumferential direction, arranged in a circular-segment-shaped region of two adjacent magnetic poles and are formed as layer conductor elements.

19. A stator (1) for an electric machine, having a polyphase winding which is formed as an insert winding and which has winding strands (3) assigned to a particular electrical phase (u, v, w), which winding strands run in each case in undulating fashion through grooves (4) formed in the stator (1) and are formed in each case from different types of conductor elements (5, 10, 11, 12), and having two holes (q),
  wherein the conductor elements (5, 10, 11, 12) are arranged in a respective groove (4) in a particular groove layer between a first or lowermost layer, facing toward a groove base, and an n-th or uppermost groove layer, averted from the groove base, wherein n corresponds to the number of conductor elements (5, 10, 11, 12) per groove (4), is an even number of at least four, wherein the conductor elements (5, 10, 11, 12) are in each case connected to one another by cohesive joining connections (9) to form a respective winding strand (3) on both face sides of the stator (1),
  wherein each winding strand (3) has a sequence of multiple first winding portions (3.1) and a sequence of multiple second winding portions (3.2) connected to the sequence of first winding portions (3.1), wherein, in each first winding portion (3.1) and in each second winding portion (3.2), there is alternation in each case between the same two adjacent groove layers,
  wherein each first and second winding portion (3.1, 3.2) has ends and comprises layer conductor elements (10) between the ends,
  wherein each first or second winding portion (3.1, 3.2) respectively with respect to the groove layer is connected to an immediately overlying or immediately underlying first or second winding portion (3.1, 3.2) respectively by means of a connection of two layer connector conductor elements (11), and
  wherein uppermost or lowermost first winding portions (3.1, 3.2) respectively with respect to the groove layer are connected in each case by means of a reversal connector conductor element (12) to one of uppermost or lowermost second winding portions (3.2) respectively such that the sequence of second winding portions (3.2) runs in the opposite circumferential direction in relation to the sequence of first winding portions (3.1), wherein the reversal connector conductor elements (12, 13) have in each case one reversal limb (12.1, 13.1) which is situated in the uppermost or lowermost groove layer and connecting portions (12.2, 13.2) of which, projecting out of the respective groove (4) on both sides, run in the same circumferential direction with respect to the stator axis (1.1) as viewed from the same face side of the stator (1) and which is the only limb, situated in one of the grooves (4), of the reversal connector conductor element (12, 13).

20. The stator as claimed in claim 19, characterized in that the reversal limbs (12.1, 13.1) of the reversal connector conductor elements (12, 13) are, in each case at two connecting portions (12.2, 13.2), connected on one side by a first reversal connection (14) to a conductor limb, situated in a second-uppermost or second-lowermost groove layer, of an uppermost or lowermost winding portion (3.1, 3.2) and on the other side by a second reversal connection (15) to a conductor limb, situated in the same groove layer, of an uppermost or lowermost winding portion (3.1, 3.2), wherein the interval width (S) of the second reversal connection (15) is smaller than the interval width (S) of the first reversal connection (14) in the case of a shortened reversal connector conductor element (12) by one groove (4), and is equal in the case of an unshortened reversal connector conductor element (13).

* * * * *